(12) United States Patent
Riek et al.

(10) Patent No.: US 11,493,899 B2
(45) Date of Patent: Nov. 8, 2022

(54) METHOD FOR IDENTIFYING A WORKPIECE, DETERMINING A MEASUREMENT SEQUENCE, AND MEASURING A WORKPIECE WITH A MEASUREMENT DEVICE

(71) Applicant: Carl Zeiss Industrielle Messtechnik GmbH, Oberkochen (DE)

(72) Inventors: Matthias Riek, Aalen (DE); Thomas Mueller, Huettlingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 238 days.

(21) Appl. No.: 16/207,026

(22) Filed: Nov. 30, 2018

(65) Prior Publication Data
US 2019/0101889 A1 Apr. 4, 2019

Related U.S. Application Data

(63) Continuation of application No. PCT/EP2017/063108, filed on May 31, 2017.

(30) Foreign Application Priority Data

Jun. 1, 2016 (DE) ...................... 10 2016 209 557.9

(51) Int. Cl.
*G05B 19/401* (2006.01)
*G01B 21/04* (2006.01)

(52) U.S. Cl.
CPC ......... *G05B 19/401* (2013.01); *G01B 21/047* (2013.01); *G05B 2219/37018* (2013.01)

(58) Field of Classification Search
CPC ................ G05B 19/401; G05B 19/128; G05B 2219/37018

(Continued)

(56) References Cited

U.S. PATENT DOCUMENTS 5,117,169 A 5/1992 Kakino et al.
5,198,990 A * 3/1993 Farzan ................... G01B 21/04
700/195

(Continued)

FOREIGN PATENT DOCUMENTS

DE 39022549 T2 5/1996
DE 10315921 A1 10/2004

(Continued)

OTHER PUBLICATIONS

C. Hayat, "Linking Barcode Technology to Quality Control Scanning the Way to Productivity," Hexagon Metrology Inc. (2015).

(Continued)

*Primary Examiner* — Chun Cao
(74) *Attorney, Agent, or Firm* — Falk Ewers; Ewers IP Law PLLC

(57) ABSTRACT

A method for measuring a workpiece by a measurement device includes capturing an identification feature of a workpiece by a capture device, determining an item of identity information relating to the workpiece, comparing the identity information with identity information relating to a plurality of workpieces from a database which stores the identity information relating to the plurality of workpieces, identifying the workpiece in the database, and/or characterizing the workpiece from the comparison with the database, determining a measurement sequence stored in the database for the identified workpiece, or suggesting features or steps of a measurement sequence for the identified workpiece, and measuring the workpiece in accordance with the measurement sequence in the measurement device.

20 Claims, 13 Drawing Sheets

(58) Field of Classification Search
USPC .......................................................... 700/195
See application file for complete search history.

(56) References Cited

U.S. PATENT DOCUMENTS

| | | | | |
|---|---|---|---|---|
| 7,587,834 | B2* | 9/2009 | Eaton | G01B 5/008 |
| | | | | 33/503 |
| 9,025,855 | B1* | 5/2015 | Christoph | G01N 23/046 |
| | | | | 382/152 |
| 9,429,416 | B2 | 8/2016 | Kocic et al. | |
| 2006/0122727 | A1* | 6/2006 | Chang | B24B 49/02 |
| | | | | 700/194 |
| 2007/0050072 | A1 | 3/2007 | Schwotzer | |
| 2010/0299945 | A1* | 12/2010 | Lacy | G01B 5/0004 |
| | | | | 33/503 |
| 2012/0246953 | A1 | 10/2012 | Engel | |
| 2013/0197852 | A1 | 8/2013 | Grau et al. | |
| 2013/0331986 | A1* | 12/2013 | Tait | G05D 1/0268 |
| | | | | 700/245 |
| 2015/0153729 | A1* | 6/2015 | Kurahashi | H01L 21/68 |
| | | | | 700/110 |
| 2015/0178484 | A1 | 6/2015 | McNamara et al. | |
| 2016/0274570 | A1* | 9/2016 | Shih | G05B 19/41875 |
| 2016/0343125 | A1 | 11/2016 | Keitler et al. | |

FOREIGN PATENT DOCUMENTS

| | | |
|---|---|---|
| DE | 102009049534 A1 | 4/2011 |
| DE | 112013000727 T5 | 11/2014 |
| DE | 102013114707 A1 | 6/2015 |
| DE | 102014224273 A1 | 6/2015 |
| DE | 202014104322 U1 | 2/2016 |
| EP | 2881705 A2 | 6/2015 |
| WO | 2007025997 A1 | 3/2007 |
| WO | 2009127526 A1 | 10/2009 |

OTHER PUBLICATIONS

Hexagon Metrology „Measuring on Machine Tools—m&h Probing Systems and Software, product brochure (2015).
SICK AG, Waldkirch "Identifikationslsungen, Produkte im berblick" and English language translation thereof, Jan. 16, 2015.
SICK AG, Hand-held scanners IMD24x and English language translation, Jan. 19, 2015.
Case Study: "Holder installation for aircraft construction" and English language translation, EXTEND 3d GmbH, last accessed at URL: http://www.extend3d.de/dwl/anwendungsbeispiele/deutsch/haltermontage.pdf on Apr. 10, 2017.
International Search Report of the European Patent Office in PCT/EP2017/063108 (from which this application claims priority) dated Aug. 16, 2017 and English-language translation thereof.

* cited by examiner

METHOD FOR IDENTIFYING A WORKPIECE, DETERMINING A MEASUREMENT SEQUENCE, AND MEASURING A WORKPIECE WITH A MEASUREMENT DEVICE

CROSS REFERENCE TO RELATED APPLICATIONS

This application is a continuation application of international patent application PCT/EP2017/063108, filed May 31, 2017, designating the United States and claiming priority to German application 10 2016 209 557.9, filed Jun. 1, 2016, and the entire content of both applications is incorporated herein by reference.

TECHNICAL FIELD

The present invention relates to a method for measuring a workpiece with a measurement device, to a method for controlling the production of workpieces, to a capture device for capturing an identification feature of a workpiece of a measurement device and to a measurement device which includes such a capture device.

BACKGROUND

When measuring workpieces with a measurement device, it is often difficult to assign or find an appropriate or existing measurement sequence or a suitable measurement sequence, in particular if workpieces of different shapes and configurations are intended to be measured in succession.

When producing workpieces, it is often necessary to ensure a fast and reliable quality check when producing workpieces of different shapes and configurations. The quality check is often carried out by measurement devices. If workpieces of different shapes and configurations are produced one after the other in a production machine, it is particularly difficult to ensure a quality check which copes with the different workpieces.

SUMMARY

It is an object of the invention is to provide a solution for one or more of the issues mentioned above.

A method for measuring a workpiece with a measurement device is provided. The method includes:

a) capturing an identification feature of a workpiece or of a workpiece batch and/or of an arrangement of a plurality of workpieces using a capture device, and determining an item of identity information relating to the workpiece, the workpiece batch and/or the arrangement, b) comparing the identity information with identity information relating to a plurality of workpieces, a plurality of workpiece batches or a plurality of arrangements of a plurality of workpieces from a database which stores this identity information relating to the plurality of workpieces/workpiece batches/arrangements, c) identifying the workpiece, the workpiece batch or the arrangement of the plurality of workpieces in the database, and/or characterizing the workpiece, the workpiece batch or the arrangement of the plurality of workpieces from the comparison with the database in step b), d) determining a measurement sequence stored in the database for the identified workpiece, the workpiece batch, in particular for a workpiece from the workpiece batch, or the arrangement of a plurality of workpieces, or suggesting features or steps of a measurement sequence for the identified workpiece, the workpiece batch, in particular for a workpiece from the workpiece batch, or the arrangement of a plurality of workpieces, e) measuring the workpiece or at least one workpiece from the arrangement of the plurality of workpieces or at least one workpiece from the workpiece batch using the measurement sequence in the measurement device.

A measurement device is a device which can be used to measure workpieces, in particular variables or a condition of a workpiece. Exemplary variables are dimensional variables such as length, width, height, and coordinates, in particular coordinates of points on a surface (surface coordinates). An exemplary condition is a surface roughness, the presence of cavities, etc.

Exemplary measurement devices are radiation-based measurement devices, in particular x-ray measurement devices, microscopes, robot measurement devices, and coordinate measuring machines. The term "measurement device" can therefore have one or more of these meanings.

A typical measurement device is a coordinate measuring machine (CMM), in particular an optical or tactile CMM. A coordinate measuring machine may have a conventional design such as a bridge measuring machine, a horizontal arm measuring machine, or a gantry CMM.

Robot measurement devices may include as a measurement device an optical, a tactile or a radiation-based measurement device which can be moved to a desired location using a movement device, e.g., a robot arm. For example, a robot measurement device may include a coordinate measurement device.

The method according to an aspect of the invention may include as a further step: transmitting the measurement sequence to the measurement device. This step is useful, for example, when the measurement sequence is not determined or features or steps of a measurement sequence in step d) are not suggested inside a measurement device.

A workpiece is also referred to as a test object.

A workpiece batch is a plurality of identical workpieces, wherein the individual workpieces are not individually identified.

An arrangement of a plurality of workpieces is a spatial arrangement of a plurality of workpieces, in particular an arrangement of a plurality of workpieces on a carrier structure, for example a pallet.

If reference is made below to a workpiece or an arrangement of workpieces, the disclosure may likewise apply to a workpiece batch even though this is not mentioned again every time.

One or more data items relating to the workpiece may be represented or stored in the identification feature. The identification feature may directly represent data. Examples thereof are letters, numbers, symbols, or any desired combination thereof.

An item of identity information may include: letters, numbers, other characters, images or symbols, dimensional data, such as two-dimensional or three-dimensional data, or any desired combination thereof. The identity information may be present in encrypted or coded form.

According to an aspect of the invention, data relating to the workpiece are coded in the identity feature. The term "coded" typically means that to a character in a first character set is uniquely assigned a character or a character string from another character set. An example of this is a barcode in which data are represented in binary symbols.

The term "data" which is in the plural may mean one item of information or a plurality of items of information, which can be expressed by the expression "one or more data items". The data are selected, in particular, from the following: data for identifying the workpiece, data for characterizing the workpiece, and data relating to at least one physical variable of the workpiece.

Data for identification may be data for generic or individual identification. Data for one-to-one identification are typically present in the identification feature. Data for identification may have, for example, an item of information relating to the type of workpiece involved or the individual item of a workpiece involved.

Data for characterization may be information relating to the type of workpiece, for example, which shape feature or characteristic feature a workpiece includes. Data may relate to at least one physical variable of a workpiece are, for example, to the external shape or dimension of the workpiece (such as length, width, height of the workpiece, or substructures of the latter).

The term "identification feature" means a feature which has one or more data items for identifying the workpiece and/or one or more data items for characterizing the workpiece and/or data relating to at least one physical variable of the workpiece. The term "identification feature" is used as a collective term for this but may, in particular, have one or more of the meanings mentioned.

An identification feature may be, in particular, an optical feature or an electrical feature or a combination thereof.

Optical features may be, for example, one-dimensional or two-dimensional barcodes or descriptions, in particular including alphanumeric character strings, imprinted on the workpiece. A further possible optical identification feature may be a workpiece image of the relevant workpiece. For example, a workpiece image may be stored as a drawing in a database used in the method. The workpiece may be identified by image recognition from such an image.

An electrical identification feature may be selected from the following: radio-based electrical identification features such as passive or active radio chips (for example Radio-frequency identification (RFID), Near-field communication (NFC)) which can be mounted on a surface of the workpiece or in a depression. Cable-based electrical identification features, for example wired identity (ID) chips (for example Dallas one-wire bus), which are mounted on the workpiece and, for reading, enable an electrical connection to the capture device, are also conceivable. An electrical identification feature may be readable and may additionally also be writable. For example, information, such as process parameters, may be read, stored and/or deleted before and/or after a measurement process on the workpiece or the arrangement of workpieces.

Various capture devices and features of a capture device are described below. The capture device is also referred to as a reading device.

The capture device may operate optically, wirelessly or by electrical contact, that is to say the capture device may capture the identification feature in this manner. These variants are discussed below.

An optical capture device may include, for example, a camera and/or a laser scanner. This makes it possible to capture an optical identification feature or an optically capturable identification feature. An optical identification feature is, for example, an image, a contour or a shape feature of the workpiece.

A capture device which operates wirelessly or by electrical contact is also collectively referred to as an electrical capture device. An electrical capture device can communicate with or can capture an electrically capturable identification feature. For example, the identification feature may have an integrated circuit, for example in the form of a chip, which can communicate via radio. The capture device may read data from such a circuit. Generally, wireless communication can take place using any type of electromagnetic waves, in which case radio waves are particularly suitable.

A capture device operating by electrical contact is also referred to as a wired capture device. The wired capture device communicates with the identification feature via an electrical connection which is wired.

Further features of a capture device, such as a processor or a communication interface, are also described below.

Generally, the capture device may be arranged in or on a measurement device or may be connected to the measurement device. On the other hand, the capture device may be an external device. This is also discussed later.

The identification feature may have a writable memory. The method may include: storing information from the measurement of the workpiece or the arrangement of a plurality of workpieces in the memory of the identification feature. Such information may be measurement results from the coordinate measurement.

If the identification feature has a writable memory, the method may also include the step of: generating a further item of identity information relating to the workpiece, and storing the further item of identity information in the memory of the identification feature. Such a further item of identity information may be an additional item of identity information for an item of identity information which is already available. Examples are: an image of the workpiece generated using an optical capture device, for example a camera, dimensional data, such as two-dimensional or three-dimensional (length, width) data, relating to the workpiece, etc.

A database may be connected to a controller and/or to a measurement computer of the coordinate system. In addition to said item of identity information, measurement data of the relevant workpiece may be stored relating to a workpiece to which the item of identity information belongs. The information from the measurement of the workpiece may likewise be stored in the database in a manner assigned to the workpiece.

Suggesting features or steps of a measurement sequence: In step d), features or steps for a measurement sequence may be created if a complete measurement sequence is not yet available for the identified workpiece. The same applies to an arrangement of a plurality of workpieces. The measurement sequence is, for example, a measurement sequence which is suitable for the shape or shape features of the workpiece. Examples of a measurement sequence are a sequence of probe points, a sequence of scans, circle measurements, surface roughness measurements, and angle measurements. When suggesting features or steps, it is possible for a machine or computer-controlled assistant to suggest these features. For example, it is possible to suggest which of the features are intended to be measured first or are intended to be measured. This can be carried out depending on a type of workpiece if the workpiece type was determined during identification.

Data or results from the measurement of the workpiece which are obtained in step e) can be stored in the database.

In an exemplary embodiment, the capture device includes a coupling device. The capture device is coupled to a movement device of the measurement device, in particular of a CMM, via the coupling device, and the movement device is used to move the capture device into a position for capturing the identification feature. The capture device which includes the coupling device is an electrical capture device, in particular. The movement device can be used to move the capture device close to an identification feature; in particular, an electrical capture device can be moved close to an electrical identification feature, wherein the electrical capture device and the electrical identification feature can communicate via cable or radio. Radio communication between the capture device and the identification feature can be designed only for short distances, so that the creation of a relative proximity is advantageous. A relative proximity is also very advantageous for the creation of a cable connection.

A movement device is a device of the measurement device configured to move a measurement system, in particular a tactile or optical measurement system. In a coordinate measuring machine, the movement device is also referred to as a traversing device. A traversing device can be used to move a measurement system along one or more axes. The movement device can typically be moved in three spatial directions, in particular along the axes of a Cartesian coordinate system. During measurement operation of the measurement device, a measurement system, in particular a measurement sensor, is moved to a desired position using the movement device. In this exemplary embodiment, the movement device is used to move the capture device to a desired position. The coupling device is designed in such a manner that it is compatible with the coupling device on the movement device. The coupling device may be a coupling device which is usually also present on a measurement system for measurement, in particular for coordinate measurement, for example a coupling device which is present on a measurement head. One example of a coupling device is a three-point coupling device.

In the above exemplary embodiment in which the capture device has a coupling device, before the workpiece is measured, the capture device is decoupled from the movement device and a measurement system for measuring the workpiece is coupled to the movement device. This measurement system can be used to measure the workpiece in step e). As already stated, the measurement system is typically a tactile or an optical measurement system. In this exemplary embodiment, the capture device and the measurement system are devices which are structurally separate from one another. However, it is alternatively possible to integrate a capture device in a measurement system, for example in a tactile or optical measurement system. This has the advantage that there is no need to switch between the capture device and the measurement system. If the capture device and the measurement system are structurally separate from one another and each has a coupling device for coupling to a movement device, the measurement system and the capture device for the identification feature can each be stored in a changing magazine if not required and can be taken from the changing magazine if required by coupling to the movement device. It is possible to change between the capture device and the measurement system in a fully automated manner.

In another exemplary embodiment of the method, the capture device has a light projection device, and the method includes:

determining an image of the workpiece that is stored in the database and/or an item of information relating to a position or pose of the workpiece to be established for measurement, and projecting the image, the position and/or the pose of the workpiece onto a base or a measurement table of the measurement device.

The term "pose" is understood to mean "position and orientation". The light projection device may serve the user as a visualization assistance system for placing the workpiece in the measurement device. Furthermore, the projection device or the projection may be used for a visual preassessment of the workpiece by the user. After the identification feature has been captured, a virtual image of the workpiece, which may be present in the database, can be transmitted to the projection device, for example. The position of the capture device or of the light projection device in a coordinate system of the measurement device is known. Furthermore, the desired position of the workpiece is known. The light projection device can be used to project an image of the workpiece, in particular an image of a three-dimensional model, onto the measurement table or the base of the measurement device. As a result, a user can correctly place the workpiece in the measurement device and a visual preassessment is possible, for example in order to determine whether particular features of the workpiece, such as holes, are present.

In an exemplary embodiment of the method above, in step a), the identification feature of the arrangement of the plurality of workpieces is first captured and the identification feature of at least one workpiece from the arrangement is subsequently captured, in step c), the arrangement is identified and at least one workpiece from the arrangement is subsequently identified, and in step e), the at least one workpiece from the arrangement is measured.

In this exemplary embodiment, a stepwise or nested method is provided in which in a first step an arrangement of workpieces, for example on a pallet, is captured. The number and position of workpieces in the arrangement are typically stored in the identification feature of the arrangement. In a further step, the identification feature of at least one workpiece, typically of all workpieces in the arrangement, is captured and the workpiece is identified. Depending on the identification feature and workpiece, an individual measurement sequence for the relevant workpiece is determined therefrom and the workpieces can be measured sequentially or in succession using the associated measurement sequence.

In particular, during the identification of the arrangement, a number and/or a spatial position of at least one workpiece from the arrangement can be determined.

According to another aspect of the invention, a method for controlling and/or regulating the production of a workpiece is provided. The method includes:

i) producing a first workpiece or a workpiece batch using a production machine, ii) measuring the workpiece or measuring a workpiece from the workpiece batch using a measurement device, wherein the measurement device, a controller of the measurement device and/or a measurement computer of the measurement device is/are connected to the production machine via a data transmission connection or a network, iii) comparing measurement data from the measurement of the workpiece or of the workpiece from the workpiece batch with target data for the workpiece or target data for the workpiece from the workpiece batch which are stored in a database, iv) forwarding a result from the comparison of the measurement data to the production machine via the data transmission connection, and v) controlling and/or regulating the production of at least one further workpiece in the production machine.

A network may include as devices, e.g., a computer, a server, a storage medium, and a cloud, etc.

The workpiece may be an end product, a preliminary product or an intermediate product. The production machine is, in particular, a machine tool, a computer numerical control (CNC) machine, a 3-D printer, a turning lathe, a milling cutter, an anodizing device, a casting machine, and injection-molding machine.

The production machine may likewise be connected to a database mentioned. Tolerance deviations of workpieces, which are measured by the CMM, can also be forwarded to the production machine via the database using the method described above. The production machine can then adapt the production parameters for a future further workpiece or a plurality of workpieces and/or can exchange production tools, such as drills or milling cutters, if necessary. This method can be used to accelerate and optimize the production process if it has been determined, for example, that the workpieces are still far away from the tolerance limits and production can therefore be carried out more quickly. In this case, although inaccuracies in the production may arise, they are still tolerable in the range of the tolerance limits.

In the above-mentioned method for producing a workpiece, the workpiece or a workpiece from the workpiece batch can be measured using a measurement device in step ii) according to the method for measuring a workpiece with a measurement device, as already described at the outset. In this respect, reference is made, in particular, to steps a) to e) already discussed above, and to the exemplary embodiments of such a method.

In one exemplary embodiment, a workpiece-specific identification feature is generated and/or mounted on the workpiece from the workpiece batch. This exemplary embodiment relates to the method variant referring to a workpiece batch. Here, only the workpiece batch may initially have an identification feature, but not one or more of the individual workpieces from the workpiece batch. In this exemplary embodiment, an individual workpiece from the workpiece batch is then also provided with an identification feature. An appropriate measurement sequence can be determined for a workpiece batch, for example, if all parts of a workpiece batch are geometrically identical. An individual workpiece can be provided with a bijective identification feature after the measurement sequence. A measurement sequence for the individual workpiece, i.e., a bijective measurement sequence, can be assigned to the bijective identification feature.

The mounting process is carried out, in particular, by imprinting, adhesively bonding or fastening to the workpiece in another manner using a fastening means, in particular on the surface of the workpiece. For example, an identification feature for a batch or a unique identification feature for a workpiece individual may be allocated. Such newly mounted identification features can each be created for a workpiece or a batch in the database. The identification feature can be generated using a production device for such an identification feature, for example a writing device, a printer, a laser, another machine for generating and/or applying an identification feature. To the identification feature generated or mounted can be assigned process parameters and/or measurement sequences and these can be stored in the database together with the identification feature.

In another exemplary embodiment, the identification feature can be generated and/or mounted before or during the measurement of the workpiece from the workpiece batch.

Step v) of the control and/or regulation also includes the production of at least one further workpiece in the production machine. In one variant of the production method above, the following step is also carried out:

vi) generating or mounting an identification feature on the further workpiece, which can be carried out during or after the production of the further workpiece.

In one of the methods, provision may generally be made for process parameters, measurement sequences or the identification feature to be updated, expanded and/or deleted in the database after a measurement sequence. In addition to the information indicating that the workpiece has been measured, the measurement log and possibly information for rectification, for example if the workpiece is out of tolerance, can thus be stored.

According to another aspect of the invention, a capture device for capturing an identification feature of a workpiece in a measurement device and/or of an arrangement of a plurality of workpieces is provided. The capture device includes:

an information capture device, a processor which controls the information capture device, and a communication interface which is used or can be used to connect the information capture device to a measurement device.

The information capture device is set up to capture an identification feature. The information capture device may be an electrical information capture device and/or an optical information capture device. The information capture device may communicate with an identification feature wirelessly or via a cable connection. A capture device having an electrical information capture device is an electrical capture device already disclosed above. A capture device having an optical information capture device is an optical capture device already disclosed above. A combination thereof is possible.

The processor takes over the control of the information capture device. Operations, such as computing operations, which are used to determine the identity information from the identification feature can run on said processor. Furthermore, the processor may transmit and/or receive data via the communication interface.

The communication interface may connect the capture device to a measurement device, in particular to a controller or a measurement computer. The communication interface is used, in particular, to transmit determined identification features, identity information and/or images of the workpiece. The communication interface may be a wired communication interface or a wireless communication interface. A wired communication interface may be local area network (LAN) interface, a Controller Area Network (CAN) interface, a Universal Serial Bus (USB) interface, and a Recommended Standard 232 (RS232) interface, for example. Wireless connections between the capture device and the CMM may be, for example, Bluetooth connections, wireless local area network (WLAN) connections, ZigBee connections, and GSM/UMTS/3G/4G connections. The capture device may have a voltage supply. The voltage supply may be provided in a wired manner and/or by a battery/rechargeable battery. Contactless energy transmission by induction is also conceivable as a voltage supply.

A capture device according to an aspect of the invention can also have a light projection device which can be used to project an image and/or a pose of a workpiece onto a base or a measurement table of a measurement device. This has already been discussed above on the basis of a specific method sequence.

Apparatuses according to an aspect of the invention may generally contain substantive features which have been described with respect to a method according to an aspect of the invention. Substantive features which have been described with respect to apparatuses can generally be used in methods according to another aspect of the invention.

In one exemplary embodiment of a capture device, the latter has a coupling device which can be used to couple the capture device to a movement device of the measurement device. This has already been discussed above on the basis of a method according to an aspect of the invention.

In another exemplary embodiment, the capture device is integrated in a mobile operating panel for a measurement device. This makes it possible for the user to place the workpiece in the measurement region of the CMM and to capture the identification feature using the capture device by moving the operating panel into the vicinity of the measurement object.

According to another aspect of the invention, a computer program is provided which includes program code and which is designed to carry out a method according to an aspect of the invention when the computer program is executed by a processor of a measurement device, in particular by a controller of the measurement device, a computer or a capture device as described above. In particular, the computer program is designed to carry out the following steps:

a) comparing the identity information with identity information relating to a plurality of workpieces or a plurality of arrangements of a plurality of workpieces from a database which stores this identity information, b) identifying the workpiece/the arrangement of a plurality of workpieces, and/or characterizing the workpiece/the arrangement of a plurality of workpieces from the comparison with the database in step b) and in interaction with the database, c) determining a measurement sequence stored in the database for the identified workpiece/the arrangement of a plurality of workpieces, or suggesting features or steps of a measurement sequence for the identified workpiece/the arrangement of a plurality of workpieces, and d) transmitting the measurement sequence to the/a measurement device for measuring the workpiece or at least one workpiece from the arrangement of a plurality of workpieces using the measurement sequence in the measurement device.

According to an aspect of the invention, the above computer program is designed to also carry out the following step of: capturing an identification feature of a workpiece and/or of an arrangement of a plurality of workpieces, and determining an item of identity information relating to the workpiece and/or the arrangement. Alternatively, if not carried out by the computer program mentioned above, this step can be carried out by using a separate device and a further computer program stored in such a device, for example a tablet computer with a camera. This separate device is then used as the capture device, and the steps a) to d) can be carried out in a measurement device or a computer with which the capture device communicates for the purpose of transmitting data.

According to another aspect of the invention, the above computer program is designed to control the following step of: measuring the workpiece or at least one workpiece from the arrangement of a plurality of workpieces using the measurement sequence in the measurement device.

The computer program can be set up to suggest features or steps during the measurement. For this purpose, the computer program may be in the form of a machine or computer-controlled assistant. For example, it is possible to suggest which of the features are intended to be measured first or are preferably intended to be measured. This can be carried out on the basis of a type of workpiece if the workpiece type has been determined during identification.

According to another aspect of the invention, the above computer program is configured to carry out one or more of the following steps of:

comparing measurement data from the measurement of the workpiece with target data for the workpiece which are stored in the database, and forwarding a result from the comparison of the measurement data to a production machine via the data transmission connection for the purpose of controlling and/or regulating the production of a further workpiece in the production machine.

Such a computer program can be used in a method according to an aspect of the invention for producing a workpiece.

Finally, the invention also relates to a measurement device which has a capture device described above or a computer program described above. The capture device may be permanently installed in the measurement device, in particular may be integrated in an operating panel, or may be permanently installed on another component of the CMM. The installation may be stationary or locally variable, for example if the capture device is integrated in a mobile operating panel. In the case of a capture device installed in a stationary manner, the user can move the workpiece into the vicinity of the capture device before the measurement sequence.

The connection of the capture device to the measurement device may be wired or wireless.

A computer program is stored in a measurement computer of a measurement device.

BRIEF DESCRIPTION OF THE DRAWINGS

The invention will now be described with reference to the drawings wherein.

DESCRIPTION OF EXEMPLARY EMBODIMENTS

Figure 1B:
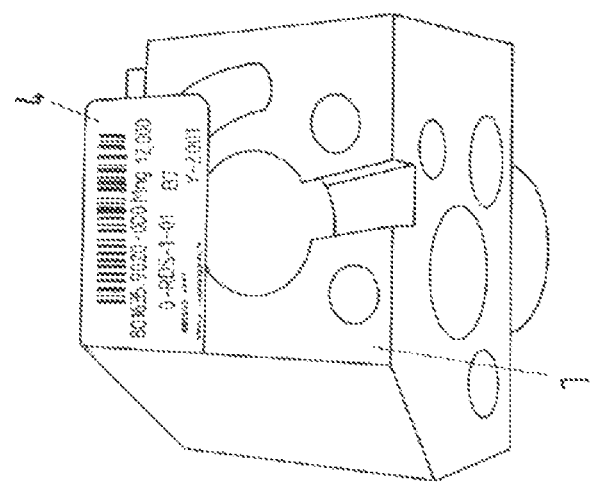
FIG. 1B shows a second view of a workpiece having different identification features.
Figure 1A:
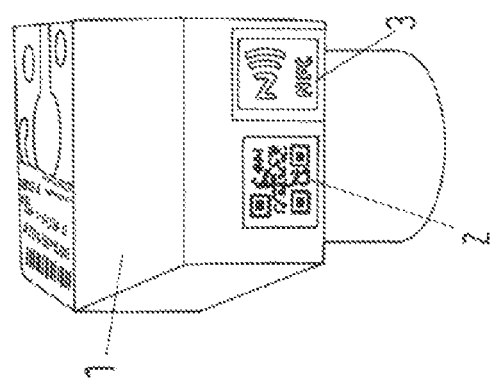
FIG. 1A shows a first view of a workpiece having different identification features.

FIGS. 1A and 1B show possible identification features 2, 3, 4 of a workpiece 1. The workpiece 1 can be seen in FIGS. 1A and 1B in two different views. Not all identification features 2, 3, 4 must be present; one of them suffices. The identification feature 2 is a two-dimensional electronically readable code. The identification feature 3 is an NFC code (near-field communication code) which is stored in a radio chip. The identification feature 4 is a combination of a barcode and plain text in the form of numbers and letters.

The identification features 2, 3, 4 are each adhesively bonded to the surface of the workpiece. Alternatively, an identification feature can be inscribed using a laser.

Figure 2:
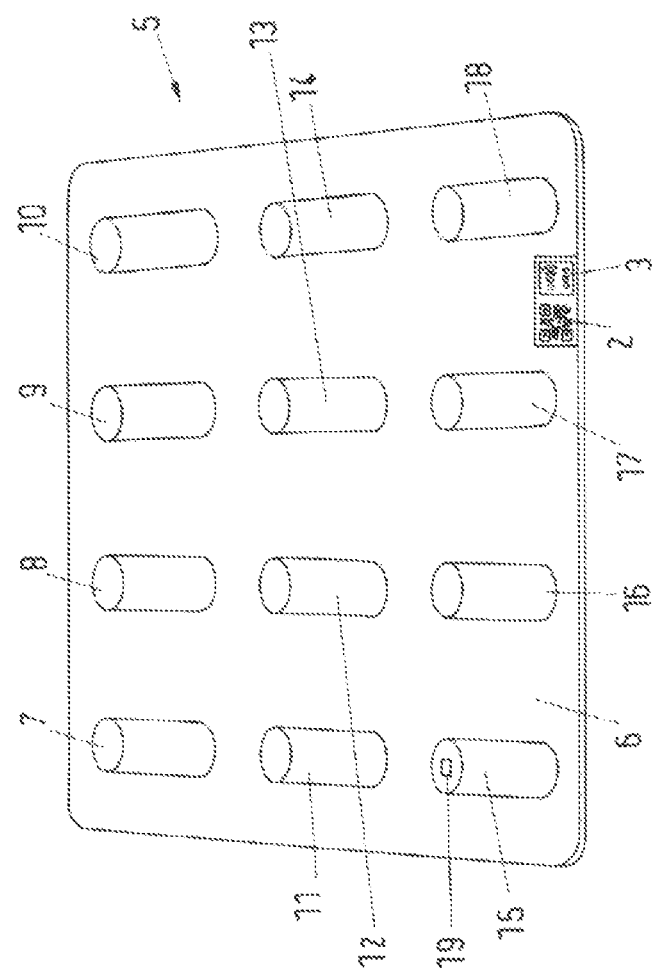
FIG. 2 shows an arrangement of a plurality of workpieces which is provided with identification features.

FIG. 2 shows an arrangement 5 of a plurality of workpieces 7, 8, 9, 10, 11, 12, 13, 14, 15, 16, 17, 18 which are arranged in the form of a matrix on a pallet 6. Two identification features 2, 3 which are the same, in terms of their type, as the identification features 2, 3 in FIGS. 1A and 1B have been applied to the bottom right of the pallet.

In FIG. 2, an identification feature 19 is mounted on the workpiece 15 and is used to identify this individual workpiece 15. In a similar manner, individual identification features, which are not shown here, may likewise be mounted on the other workpieces shown. This arrangement of identification features 2, 3 on the arrangement 5 and of individual identification features 19 is used for the special method variant of the exemplary embodiment of the invention in which the identification features 2, 3 of the arrangement 5 are first of all captured and the identification feature 19 of the workpiece 15 (and possibly further workpieces) is then captured. The arrangement can then first of all be identified from the features 2, 3 and finally the individuals can be identified from the individual identification features, such as 19.

Figure 3:
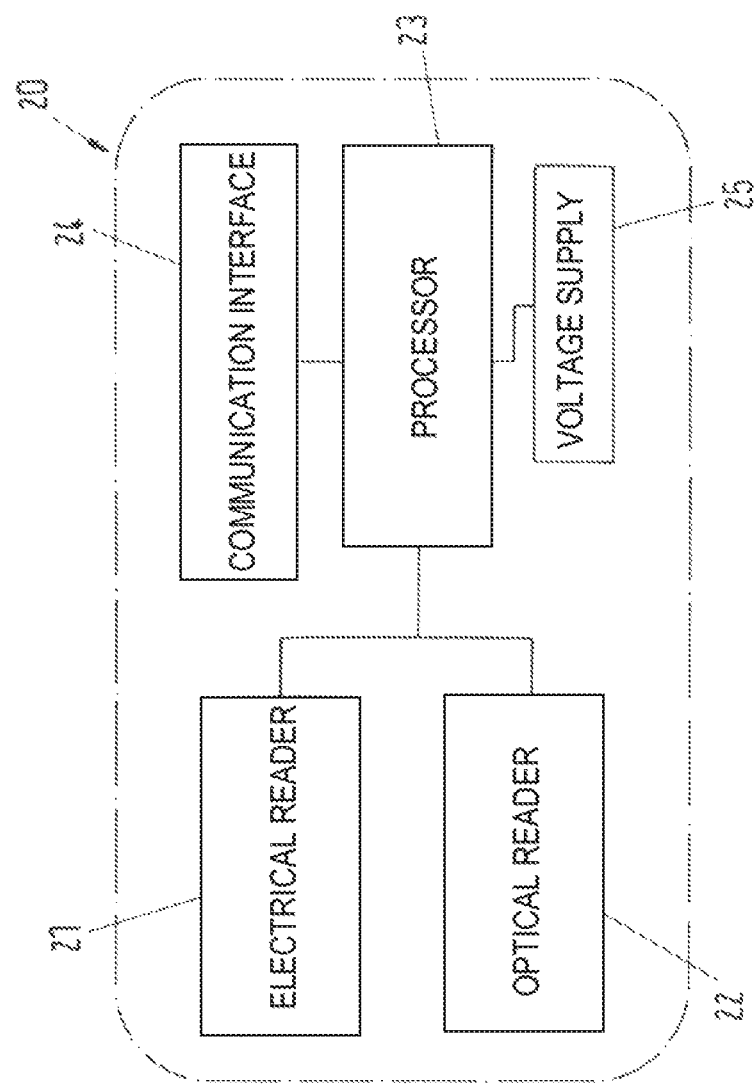
FIG. 3 shows a basic structure of a capture device.

FIG. 3 illustrates the basic structure of a capture device 20.

The capture device 20 has, as information capture devices, the electrical reader 21 and the optical reader 22. The electrical reader 21 and/or the optical reader 22 may be present. The electrical reader 21 is set up, for example, to read and/or write to a radio chip such as a RFID/NFC. Alternatively or additionally, the electrical reader 21 may be set up to read and/or write to a wired chip via an electrical contact.

The optical reader 22 is a camera or a laser scanner, for example. Optical features applied to the workpiece and/or the image/contour of the workpiece can thus be read in for identification. The readers 21, 22 were also referred to as information capture devices in the general part of the description.

The processor 23 controls the electrical reader 21 and the optical reader 22. All relevant computing operations needed to calculate the identity information from the identification feature 2, 3, 4 run on said processor. In addition, the processor 23 transmits data via the communication interface 24 or receives data from the latter.

The capture device 20 is connected to the coordinate measuring machine and/or to the evaluation computer of the coordinate measuring machine, which are also shown below, by the wired or wireless communication interface 24. The communication interface 24 is used to transmit the determined identification features and/or images of the workpiece. A wired communication interface may be, for example: a LAN interface, a CAN interface, a USB interface, and a RS232 interface. Wireless connections between the capture device and the CMM or a measurement robot or an evaluation computer may be, for example: Bluetooth connections, WLAN connections, ZigBee connections, and GSM/UMTS/3G/4G connections.

The voltage supply 25 for the capture device 20 may be provided in a wired manner and/or by a battery/rechargeable battery. Contactless energy transmission over short distances by induction can also be used to supply voltage. Exemplary embodiments of a capture device are described below. A capture device which interacts with an identification feature and captures a serial number is also referred to below as an identification/serial number capture unit (ID/SN capture device).

Figure 4A:
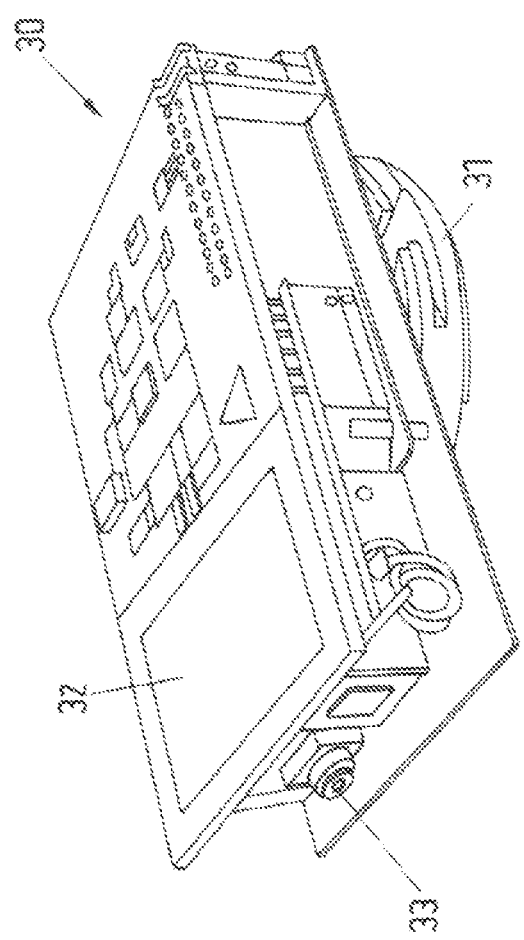
FIGS. 4A and 4B show illustrations of a capture device having a coupling device.

FIG. 4A shows a capture device 30. The capture device 30 includes coupling device 31 which can be used to couple the capture device 30 to a quill (also described below) as part of a movement device of a CMM. The coupling device 31 is a three-point bearing, for example.

The capture device 30 is both an electrical capture device and an optical capture device, that is to say the capture device 30 can operate according to both principles. A radio chip 32 which enables near-field communication is installed as an electrical component. A camera 33 is used as an optical component.

As shown in FIG. 4A, the capture device 30 may be an isolated capture device or may be installed as an additional component in a measurement sensor for coordinate measurement (for example tactile or optical), or the electrical component 32 and/or the radio component 33 can be installed in a measurement sensor. The capture device 30 can be introduced into a quill or a measurement arm of a CMM by a changing magazine. The capture device 30 can therefore be moved in the entire measurement region of the CMM in order to read in an identification feature of the workpiece. Another application is the complete automation of the measurement sequence since a changing magazine can be used to change between a capture device 30 and a measurement sensor for coordinate measurement without human assistance.

Figure 4B:
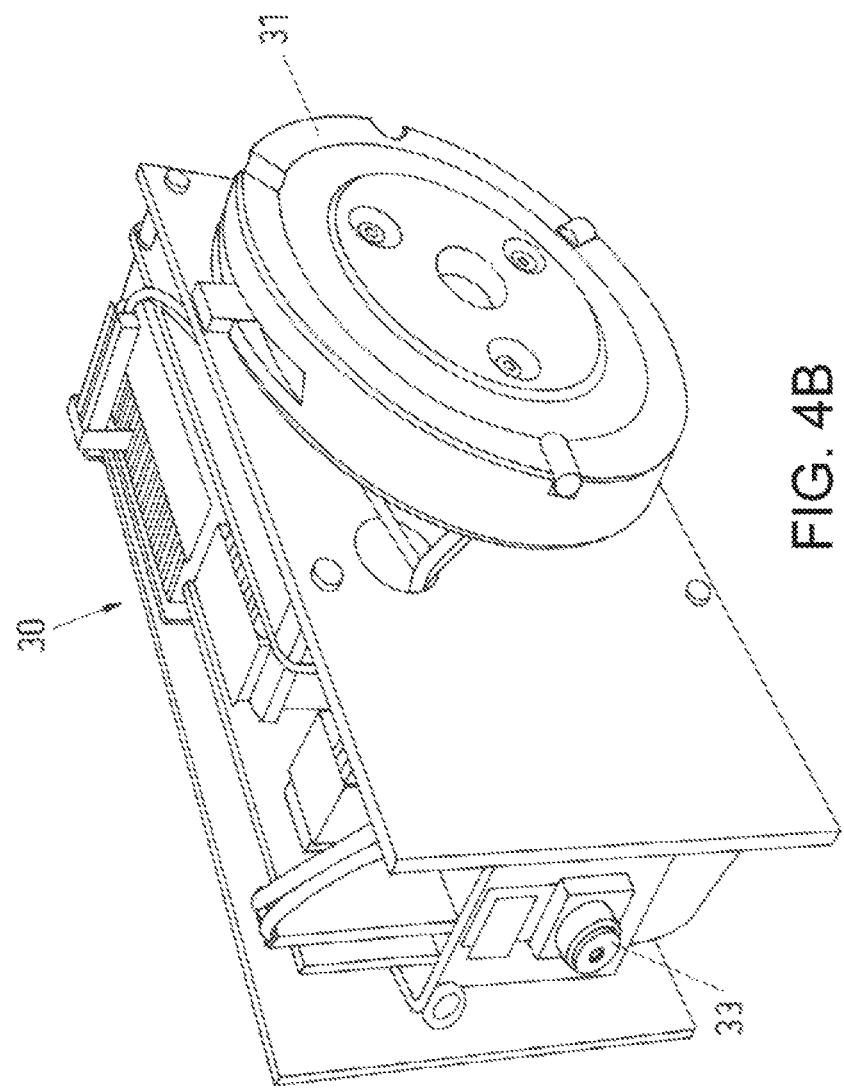

FIG. 4B shows a view of the underside of the capture device 30, in which the coupling device 31 in the form of a conventional three-point coupling with three rollers, as known from the field of the CMMs, can be seen.

Figure 5:
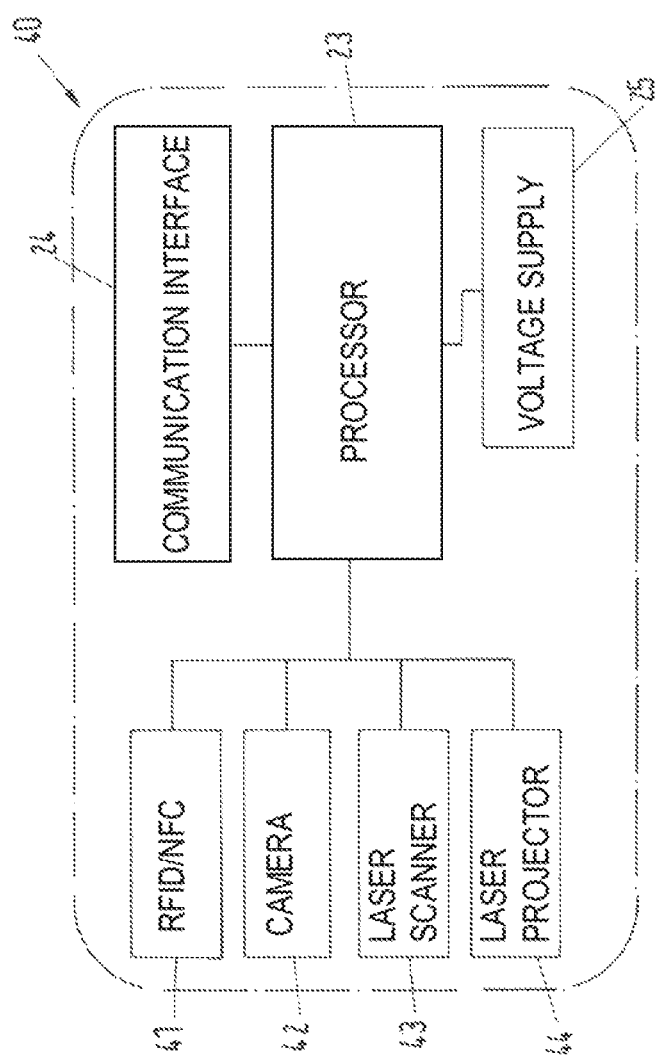
FIG. 5 shows a basic structure of a further exemplary embodiment of a capture device.

FIG. 5 shows a possible structure of a capture device 30, also referred to as a sensor, from FIG. 4A. The individual components and functions are described below. The communication interface 24, the processor 23 and the voltage supply 25 have already been discussed with regard to FIG. 3. In this exemplary embodiment, the information capture devices are denoted with the reference signs 41, 42, 43 and are explained below. The information capture device 41 is an RFID or NFC writer/reader. This is used to read an active/passive RFID or NFC chip applied to a workpiece or to a workpiece pallet as an identification feature. For this purpose, the sensor 30 must be brought into the radio range of the active/passive RFID/NFC chip by the coordinate measuring machine. The identity information relating to the workpiece, for example, may be stored on the passive chip. It is also possible to store, read and/or delete information such as process parameters/measurement logs on the passive RFID/NFC chip using the radio chip reading unit.

The camera 42 creates an image of the workpiece to be measured or of the pallet. Barcodes, for example one-dimensional or two-dimensional barcodes, in the image are evaluated and are sent to a measurement computer or to a controller of the coordinate measuring machine. There is also a possibility of recognizing the identity information by comparing the workpiece image with a database. In addition, it is intended to be possible to pre-assess the workpiece using the image before the measurement sequence. It is possible to determine, for example, whether all holes of a workpiece are present before the actual measurement sequence is started. This functionality can be used as a collision protection assistance system for measurement heads/sensors. The camera image of the workpiece can also be stored in a measurement log and in the database.

The laser scanner 43 is used to read in barcodes mounted on the surface of the workpiece, for example the barcode 2 or 4 in FIG. 1A. The laser scanner 43 may be used as an alternative or extension for the camera 42. Generally, only one of the information capture devices 41, 42 or 43 may be present. The extension of the camera 42 by the laser scanner 43 is useful when a barcode cannot be read in or recognized in the camera image, for example as a result of unfavorable light conditions or reflections on the workpiece. As a result of a three-dimensional laser scanner, the rough contour and the absolute position of the workpiece in the measurement region of the CMM can also be determined and the identity information can also be recognized or assigned by comparison with the database. A further aspect is to avoid collisions between sensors/quills/measurement arms and the workpiece if the position thereof is known.

The optionally installed laser projector 44 serves the user of the CMM as a visualization assistance system and, when placing the workpiece on the measurement device, is used for a visual preassessment of the workpiece by the measurement technician. For this purpose, the identification feature of the workpiece is read in by one of the information capture devices 41, 42, 43 in a first step. The virtual 3-D model of the workpiece is loaded from the associated test plan. Since the absolute position of the sensor 40 and the desired position of the workpiece are known, the laser projector 44 is used to project an image of the 3-D model onto the measurement table of the CMM. As a result, the measurement technician can place the workpiece on the CMM measurement table and can check, by a visual preassessment, whether all holes of the workpiece are present, for example.

Figure 6:
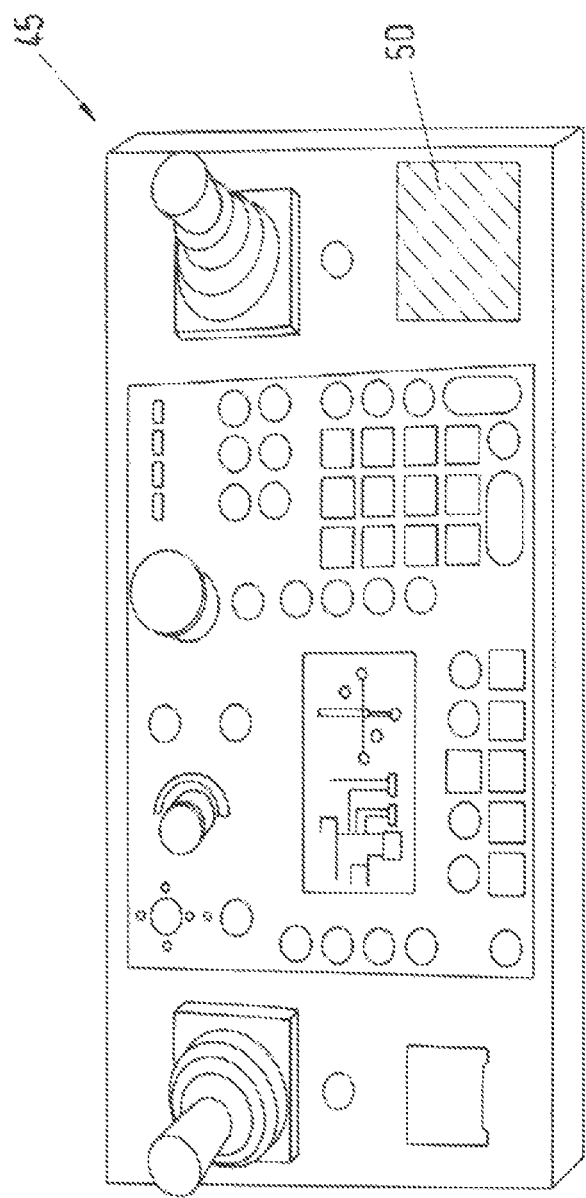
FIG. 6 shows an operating panel for a coordinate measuring machine having a capture device integrated therein.

FIG. 6 shows an operating panel with a capture device 50 installed therein. A measurement technician can place the workpiece in the measurement region of the CMM and can bring the mobile operating panel 45 into the vicinity of the workpiece and can align it with the workpiece in such a manner that the identification feature on the workpiece can be recognized and read using the capture device 50. It goes without saying that the capture device 50 may also be provided at another location on the operating panel, for example on the side or on the underside. After the workpiece has been identified or characterized after the identification feature has been read in using the capture device 50, the measurement sequence appropriate for the workpiece is loaded and is displayed on the measurement computer or the operating panel, or a new template for a measurement sequence linked to an item of identity information relating to the workpiece is opened.

Figure 7:
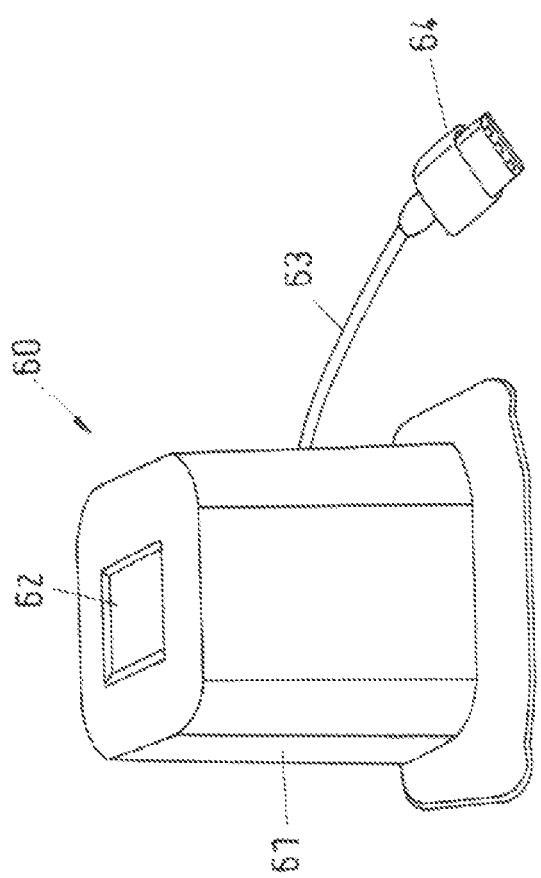
FIG. 7 shows a capture device which can be connected to a coordinate measuring machine.

FIG. 7 shows a capture device 60 which can be connected to a coordinate measuring machine or can be installed in the coordinate measuring machine. The housing 61 has the window 62 behind which an optical information capture device, for example a laser scanner, is arranged. The capture device 60 can be connected to an interface of a coordinate measuring machine, in particular of a measurement computer, via the cable 63 and the connector 64. The capture device 60 may be configured in such a manner that it can be removed from the CMM or a measurement computer again or in such a manner that it is permanently installed. In order to read in the identification feature, the user holds a workpiece at the position of the laser scanner behind the pane 62.

A capture device which is similar to the capture device 60 and communicates with the coordinate measuring machine, in particular a measurement computer, via a radio connection is also conceivable. The concept of an external wireless scanner is implemented in this case. The user can use such a scanner to read in the identification feature before a measurement sequence by holding it out to a workpiece.

An exemplary embodiment of an external wireless capture device is a smartphone or a tablet in which a camera and/or an RFID/NFC reading/writing unit is/are installed. Alternatively, it is possible to use data glasses, a camera or a smartwatch, with which an optical feature can be read in. An image of the measurement object, that is to say of the workpiece, can be created by the camera and software installed on the device. Alternatively, an NFC chip mounted on the workpiece can be read if the device is in the radio range of the chip. Identity information can be determined from the image or from the radio chip as an identification feature by the software. This information can be transmitted to the coordinate measuring machine or to the measurement computer via communication interfaces installed in the device, for example via WLAN, Bluetooth or GSM/UMTS/3G/4G communication interfaces. It is also possible to store further identity information, process parameters and measurement logs on the chip using the software. Said software can be stored in any type of capture device described in this invention or can interact with such a capture device.

A complete automated measurement sequence of the measurement device without the assistance of a user is conceivable using capture devices described above. All capture devices described can be used for the partial automation of a measurement sequence and assist the measurement technician with the daily measurement work or minimize errors/collisions caused by possible incorrect operation or false starting of an incorrect measurement sequence.

Figure 8:
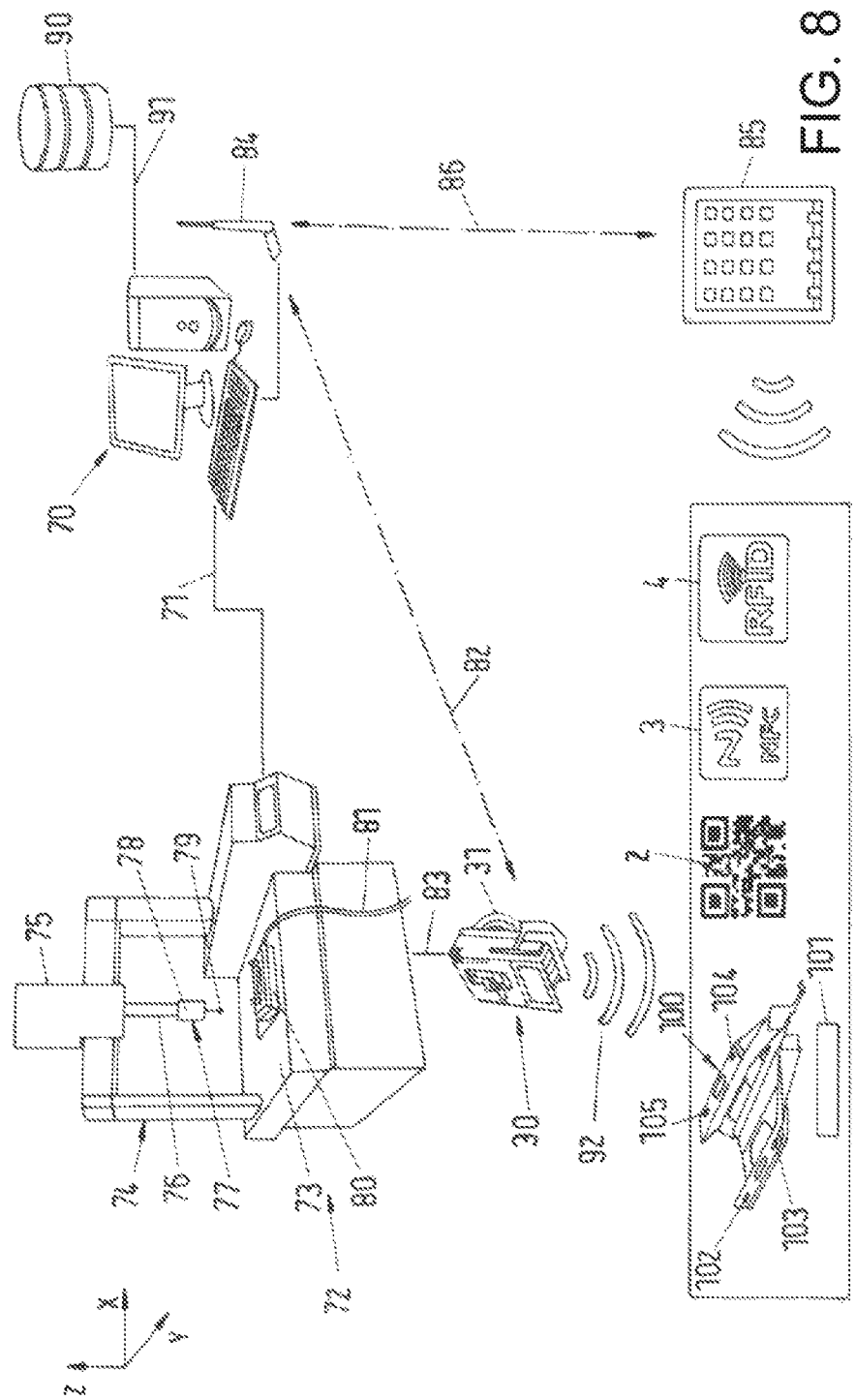
FIG. 8 shows an overview of a system for carrying out methods according to an exemplary embodiment of the invention.

FIG. 8 shows a possible overall system which has all components needed to carry out methods according to an exemplary embodiment of the invention. The measurement computer 70, also referred to as an evaluation computer, on which software according to the exemplary embodiment of the invention is installed, is connected to the coordinate measuring machine 72 via a wired or wireless communication interface 71. The measurement computer 70 also has measurement software in which a computer program according to the exemplary embodiment of the invention for carrying out methods can be integrated. The coordinate measuring machine 72 has the measurement table 73 which is also referred to as the base or workpiece holder. There is also a movable gantry 74 which can be moved in the Y direction of a Cartesian coordinate system, for example. The carriage 75 which can be moved in the X direction is arranged on the gantry 74. The quill 76 which can be moved in the Z direction is movably mounted in the carriage 75. The measurement system 77 for measuring a workpiece in a tactile manner is mounted on the end of the quill 76. The measurement system 77 has the measurement head 78 and the probe 79.

The coordinate measuring machine 72 also has the operating panel 80 which is connected via the cable 81 and is placed on the measurement table 73. The operating panel corresponds to an operating panel as shown in FIG. 6, for example.

A capture device 30 which has already been explained in FIG. 4A is depicted below the coordinate measuring machine 72 in FIG. 8. The capture device 30, also referred to as an identity/serial number reading sensor, can be coupled to the quill 76 instead of the measurement system 77. The coupling to the quill is carried out via the coupling device 31. Coupling device complementary to the coupling device 31 are provided on the quill 76. The coupling is carried out mechanically and electrically. In order to exchange the measurement system 77 for the capture device 30, the measurement system 77 is decoupled and the capture device 30 is coupled to the quill 76.

The capture device 31 is connected to the coordinate measuring machine 72 and/or to the measurement computer 70 via a wired or wireless communication interface. In this exemplary embodiment, a radio connection is established from the capture device 30 to the measurement computer 70 via WLAN/Bluetooth and is denoted using the reference sign 82. Alternatively or additionally, the connection 83, here a cable connection, to the CMM 72 can be established. The cable connection can run via the coupling device 31 and the quill 76, for example. In order to be able to transmit and/or receive radio signals, a gateway 84 is provided on the measurement computer 70 and converts wireless or wired signals. Such a gateway can alternatively or additionally be present on the coordinate measuring machine 72. The capture device 30 can therefore be controlled by the CMM 72 and/or the measurement computer 70, and data can be transmitted back and forth. Smartphones or tablets 85 or another wireless capture device can also be connected to the overall system via this gateway 84. In this exemplary embodiment, a tablet 85 is connected via a radio connection 86.

The measurement computer 70 is connected to the database 90, which may be in the form of a cloud solution, via the cable connection 91. Individual measurement logs and/or measurement data are stored together, in conjunction with identification features of various workpieces, in the database 90.

Figure 9:
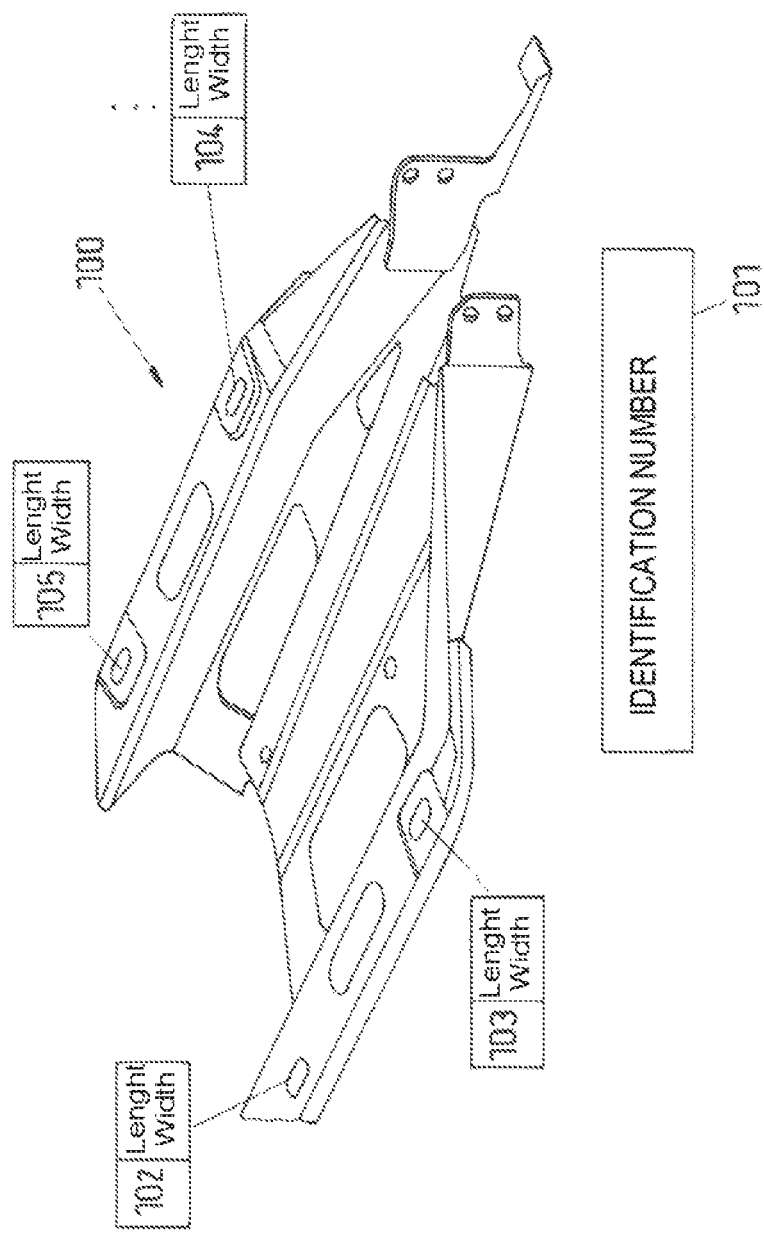
FIG. 9 shows a workpiece having identity information and indications for a measurement sequence and measurement results.

FIG. 9 schematically shows exemplary entries in a database for a workpiece 100. The identity information relating to the workpiece 100 is the identification number YX12345 which is provided with the reference sign 101. This identity information is contained in an identification feature, three different ones of which were explained, by way of example, with the reference signs 2, 3 and 4 in FIG. 9.

A possible measurement sequence on the workpiece 100 would be to measure the slots 102, 103, 104, 105. It goes without saying that further elements can be measured and this selection is only exemplary. Information to be stored in the database 90 after the measurement is the length and the width of the respective slots 102, 103, 104, 105. The information relating to the length and width of the slots can additionally or alternatively also be stored in a capture device if the latter has a writable memory.

Figure 10:
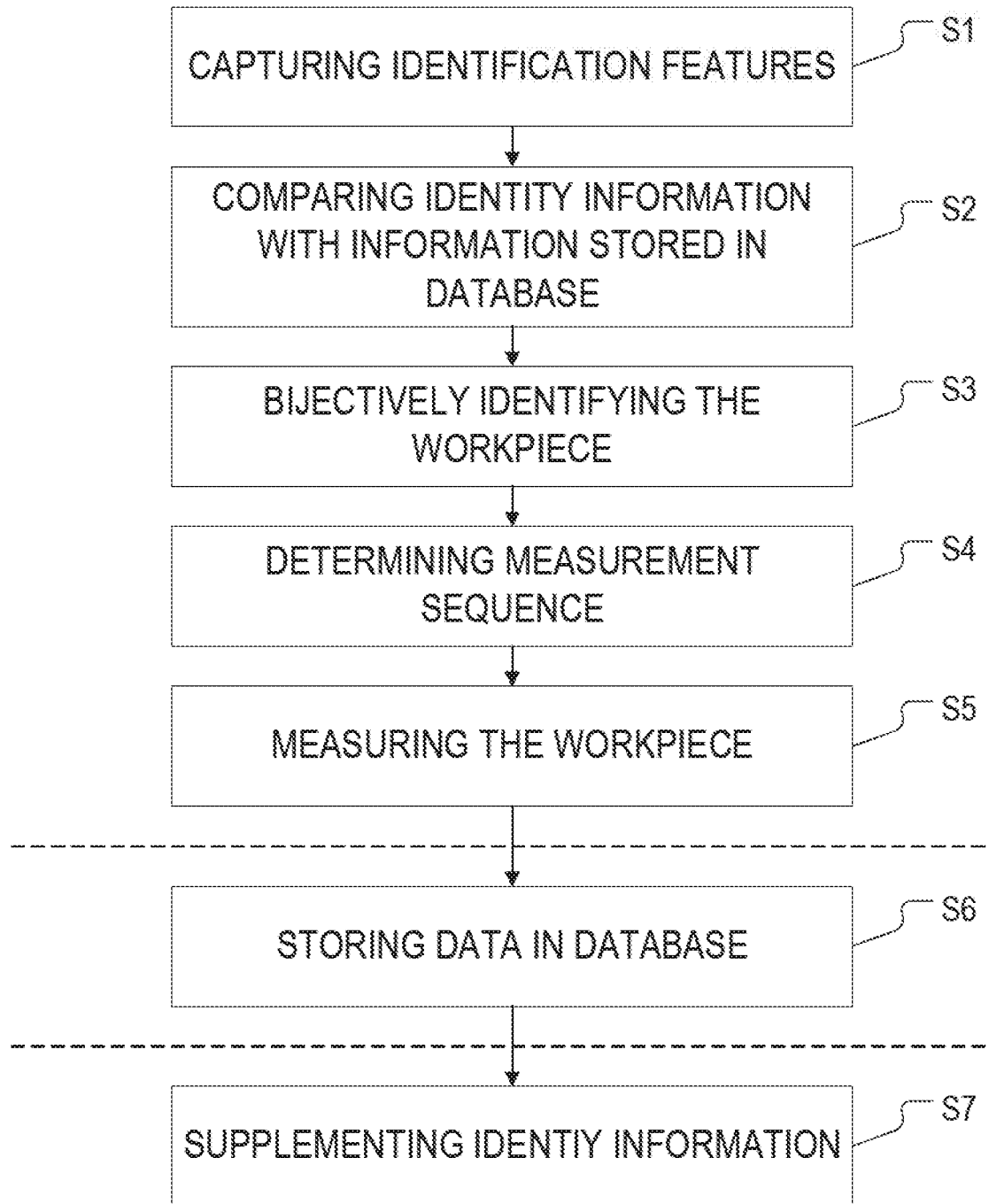
FIG. 10 shows a schematic sequence of a method for measuring a workpiece according to an exemplary embodiment of the invention.

The individual method steps of a method for measuring the workpiece 100 are explained below on the basis of the structures described above, wherein the steps are illustrated in sequence and schematically in FIG. 10. In step S1, an identification feature 2, 3 or 4 which is applied to the workpiece 100 is captured using the capture device 30. The workpiece 100, the identification features 2, 3 or 4 (which can be used alternatively or cumulatively) and the capture device 30 are illustrated in FIG. 8 and were explained above.

The identification feature 2, 3 or 4 is captured using the capture device 30 wirelessly, via radio waves, by capturing the identification feature 3 or 4 or optically by capturing the identification feature 2. The wireless capture is schematically denoted with the reference sign 92. It goes without saying that the capture device 30 is coupled to the quill 76 of the coordinate measuring machine 72 during capture, as described above. Alternative capture devices are the operating panel 80 with an integrated capture device or the tablet 85, the camera of which can be used to capture the code 2, for example, in interaction with a suitable computer program according to the invention which is stored on the tablet. A corresponding computer program can be stored in the capture device 30, the operating panel 80 and/or the measurement computer 70.

In step S1, the identity information 101 (FIG. 9, identification number) stored in the identification feature 2, 3 or 4 is determined.

In step S2, the identity information 101 is then compared with identity information (here serial numbers) relating to a plurality of further workpieces, wherein this identity information for various workpieces is stored in the database 90. In the next step, step S3, the workpiece 100 is bijectively identified from the comparison with the database. The shape of the workpiece 100, for example, and the features formed on the workpiece 100, the slots 102, 103, 104 and 105 in this example, are now known.

A measurement sequence determined in step S4 is stored in the database 90 for the workpiece 100 with the identification number YX12345. The determination can easily be carried out by virtue of the fact that, after the workpiece 100 has been identified, the measurement sequence stored for the latter in the database is also simultaneously found. In this exemplary embodiment, the measurement sequence states that the length and width of the slots 102, 103, 104 and 105 should be measured. It goes without saying that further procedures for measuring further features of the workpiece 100 using the coordinate measuring machine 72 can be stored in the measurement sequence. In the next step S5, the workpiece 100 is measured in the coordinate measuring machine 72 using the measurement sequence. In this exemplary embodiment, this therefore means that the length and width of the slots 102, 103, 104, 105 are measured. If the capture device 30 from FIG. 8 was used as the capture device, the capture device 30 is decoupled from the quill 76 beforehand and the measurement system 77 is coupled to the quill. This can be carried out in a fully automatic manner, for example by using a probe changing magazine, which is not depicted in FIG. 8 for reasons of clarity.

In step S6, data obtained from the measurement in step S5 are stored in the database 90 in a manner assigned to the identity information 101 relating to the workpiece 100. If the identification feature 2, 3 or 4 has a writable memory, the information from the measurement of the workpiece can be stored in such a memory in step S6.

In a further, optional step S7, the identity information 101 can be supplemented, for example by an image of the workpiece 100 recorded by the capture device. The further identity information generated in step S7 can be stored in a memory of an identification feature 2, 3, 4 and/or in the database 90.

Figure 11:
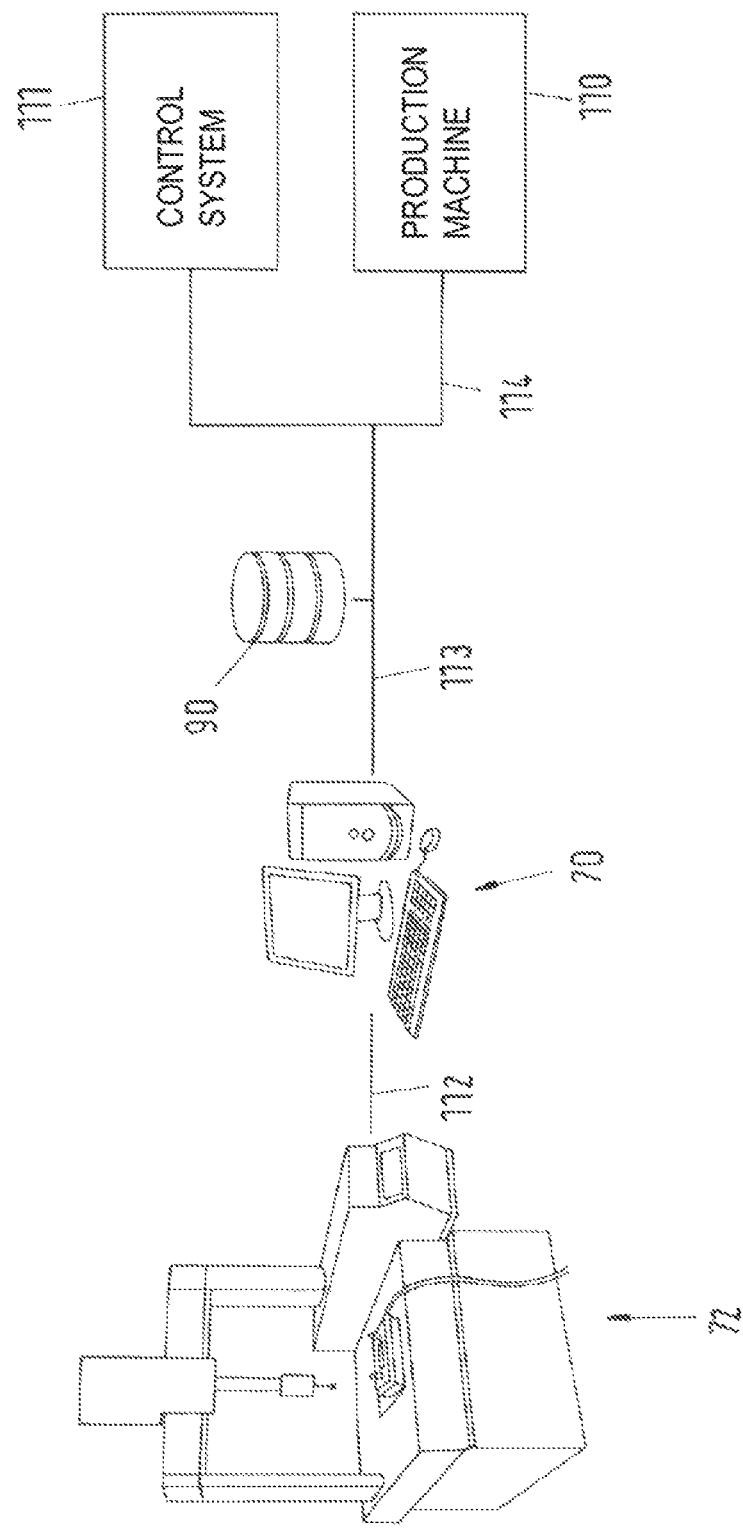
FIG. 11 shows a system for carrying out a method for controlling the production of a workpiece.

FIG. 11 shows a further aspect of the invention, namely the influencing of production processes, when a production machine 110 or a control system 111 is likewise connected to the database 90. Tolerance deviations of a workpiece, for example of the workpiece 100, measured by the coordinate measuring machine 72 can thus be forwarded to the production machine 110 or to the control system 111 via the database 90. The production machine 110 can adapt the production parameters for future workpieces in the same series or batch or can exchange a worn tool in a next step.

Figure 12:
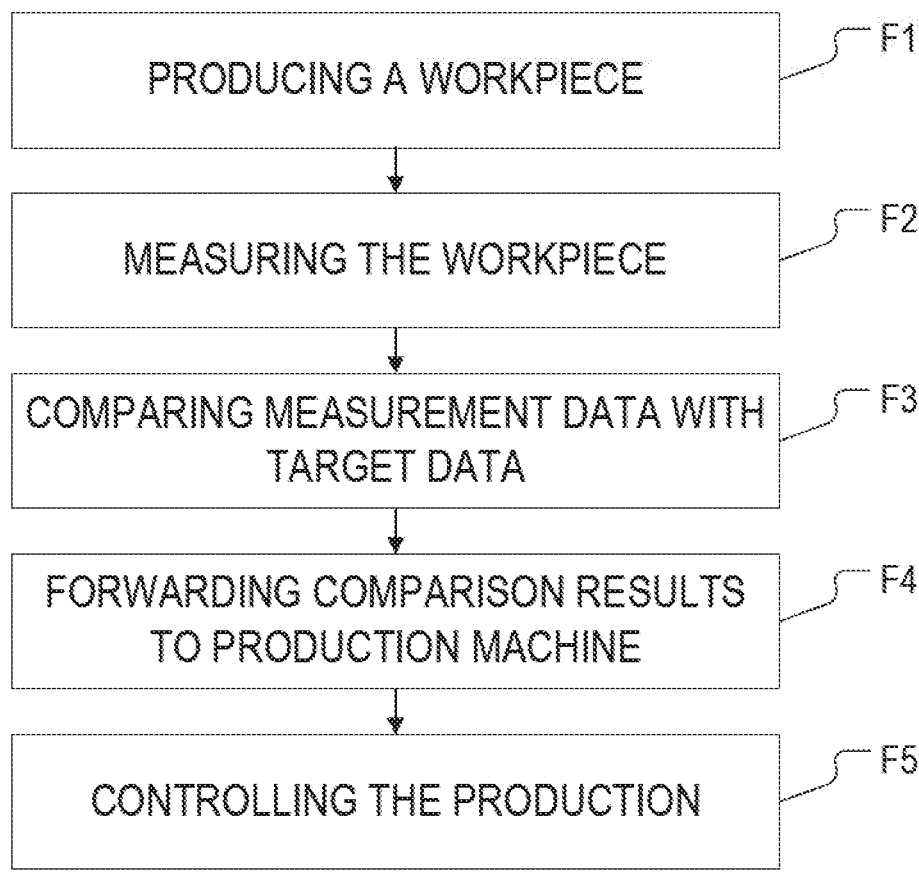
FIG. 12 shows a method sequence of a method for controlling the production of a workpiece.

A method according to an aspect of the invention for controlling the production of a workpiece is explained on the basis of FIG. 12. In step F1, a workpiece, for example a workpiece 100 from FIG. 9, is produced in the production machine 110.

In step F2, the workpiece 100 produced in this manner is then measured using the coordinate measuring machine 72. The coordinate measuring machine 72 is connected to the production machine 110 via data transmission connections 112, 113, 114 shown.

In step F3, the measurement data from the measurement of the workpiece, for example the length and width of the slots 102, 103, 104, 105 from FIG. 9 here, are compared with target data stored in the database 90. Target data for the length and width of the relevant slots 102-105 are therefore stored in the database 90.

In step F4, this comparison result is forwarded to the production machine 110 via the data connection 113, 114.

In step F5, the production of further workpieces 100, which can be denoted with 100a, 100b, 100c etc., is controlled. Various possibilities are conceivable in this case and are not conclusively mentioned: for example, the comparison of the actual measurement data with the target data may reveal that the dimensions of the holes 102-105 thus differ greatly from a given tolerance value. In this case, the production machine 110 is controlled in such a manner that the desired dimensions are complied with when producing further workpieces. If the comparison reveals that the dimensions of the slots under consideration correspond to the target values, no change in the production is indicated.

If the comparison reveals that the dimensions of the slots 102-105 are still far away from the tolerance limit, the production process in the production machine 110 can be accelerated.

In the method sequence from FIG. 12, step F3, measurement of the workpiece in a coordinate measuring machine, can be subdivided into the sequence of steps S1, S2, S3, S4, S5. In other words, step F3 collectively means steps S1 to S5, and optionally also S6 and S7.

It is understood that the foregoing description is that of the exemplary embodiments of the invention and that various changes and modifications may be made thereto without departing from the spirit and scope of the invention as defined in the appended claims.

LIST OF REFERENCE NUMERALS

1 Workpiece
2, 3, 4 Identification features
5 Arrangement
6 Pallet
7-18 Workpieces
19 Identification feature
20 Capture device
21 Electrical reader
22 Optical reader
23 Processor
24 Communication interface
25 Voltage supply
30 Capture device
31 Coupling device
32 Radio chip
33 Camera
40 Sensor
41, 42, 43 Information capture devices
44 Laser projector
45 Operating panel
50 Capture device
60 Capture device
61 Housing
62 Window
63 Cable
64 Connector
70 Measurement computer
71 Communication interface
72 Coordinate measuring machine
73 Measurement table
74 Gantry
75 Carriage
76 Quill
77 Measurement system
78 Measurement head
79 Probe
80 Operating panel
81 Cable
82 Radio connection
83 Cable connection
84 Gateway
85 Tablet
86 Radio connection
90 Database
91 Cable connection
100 Workpiece
101 Identity information
102-105 Slots
110 Production machine
111 Control system
112, 113, 114 Data transmission connections

What is claimed is:

1. A method for measuring a workpiece by a coordinate measuring machine, the method comprising:

a) capturing, by a capturing device, (i) a first identification feature of a workpiece which is the workpiece of an arrangement of a plurality of workpieces, or which is the workpiece of a workpiece batch, and (ii) a second identification feature of the arrangement of the plurality of workpieces or of the workpiece batch, wherein the second identification feature of the arrangement of the plurality of workpieces or of the workpiece batch is captured first, and the first identification feature of the workpiece of the arrangement of the plurality of workpieces or of the workpiece of the workpiece batch is captured subsequent to the second identification feature, wherein the first identification feature is at least one of a first electrically capturable identification feature and a first optically capturable identification feature generated and/or arranged on the workpiece, wherein the second identification feature is at least one of a second electrically capturable identification feature and a second optically capturable identification feature generated and/or arranged on the arrangement of the plurality of workpieces or on the workpiece batch, and wherein the capture device is at least one of an electrical transceiver configured to communicate with the electrically capturable identification feature and an optical reader configured to capture the optically capturable identification feature; and determining an item of identity information of at least one of (iii) the workpiece, (iv) the workpiece batch, and (v) the arrangement of the plurality of workpieces;

b) comparing the item of identity information with items of identity information stored in a database of (vi) a plurality of workpieces, (vii) a plurality of workpiece batches, or (viii) a plurality of arrangements of the plurality of workpieces;
c) at least one of (ix) identifying the workpiece, the workpiece batch, or the arrangement of the plurality of workpieces in the database, and (x) characterizing the workpiece, the workpiece batch, or the arrangement of the plurality of workpieces from the comparison with the items of identity information stored in the database in step b), wherein the workpiece from the arrangement or from the workpiece batch is identified subsequent to identifying the arrangement of the plurality of workpieces or the workpiece batch;
d) determining a measurement procedure stored in the database for the workpiece, the workpiece batch, or the arrangement of the plurality of workpieces, or suggesting features or steps of the measurement procedure for the workpiece, the workpiece batch, or the arrangement of the plurality of workpieces; and
e) measuring the workpiece or at least one workpiece from the arrangement of the plurality of workpieces or at least one workpiece from the workpiece batch in accordance with the measurement procedure in the coordinate measuring machine, wherein the at least one workpiece from the arrangement of the plurality of workpieces or the at least one workpiece from the workpiece batch is measured.

2. The method as claimed in claim 1, wherein the capture device captures the first and second identification features by at least one of: an electrical contact, optically, or wirelessly.

3. The method as claimed in claim 1, wherein:
each of the first and second identification features is implemented as a radio chip,
the radio chip includes a writable memory, and
the method further comprises:
storing information from the measuring of the workpiece, the workpiece batch, or the arrangement of the plurality of workpieces in the writable memory;
generating a further item of the identity information relating to the workpiece; and
storing the further item of the identity information in the writable memory.

4. The method as claimed in claim 1, wherein:
the capture device includes a coupling device,
the coordinate measuring machine includes a movement device,
the capture device is coupled to the movement device of the coordinate measuring machine via the coupling device, and
the movement device moves the capture device into a position for capturing the identification feature.

5. The method as claimed in claim 4, wherein, before the workpiece is measured, the capture device is decoupled from the movement device and a measurement system for measuring the workpiece is coupled to the movement device.

6. The method as claimed in claim 4, wherein:
the capture device includes a light projection device, and
the method further comprises:
determining at least one of an image of the workpiece stored in the database and an item of information relating to the position or pose of the workpiece to be established for measurement; and
projecting at least one of the image, the position and the pose of the workpiece onto a measurement table of the coordinate measuring machine.

7. The method as claimed in claim 5, wherein:
the capture device includes a light projection device, and
the method further comprises:
determining at least one of an image of the workpiece stored in the database and an item of information relating to the position or pose of the workpiece to be established for measurement; and
projecting at least one of the image, the position and the pose of the workpiece onto a measurement table of the coordinate measuring machine.

8. The method as claimed in claim 1, wherein, during the identifying of the arrangement of the plurality of workpieces or of the workpiece batch, at least one of a number and a spatial position of the at least one workpiece are determined from the arrangement or from the workpiece batch.

9. The method as claimed in claim 1, wherein:
the capture device includes a coupling device,
the method further comprises:
providing a robotic arm;
coupling the capture device to the robotic arm;
moving the capture device by the robotic arm into a position for capturing the first and second identification features.

10. A method for at least one of controlling and regulating a production of a workpiece, the method comprising:
i) producing the workpiece or a workpiece batch with a production machine;
ii) measuring the workpiece or measuring the workpiece from the workpiece batch by a coordinate measuring machine, wherein at least one of the coordinate measuring machine, a controller of the coordinate measuring machine, and a measurement computer of the coordinate measuring machine are connected to the production machine via a data transmission connection or a network;
iii) comparing measurement data from the measuring of the workpiece or of the workpiece from the workpiece batch with target data for the workpiece or with target data for the workpiece from the workpiece batch stored in the database;
iv) forwarding a result from the comparing of the measurement data to the production machine via the data transmission connection; and
v) at least one of controlling and regulating a production of at least one further workpiece in the production machine,
wherein the measuring of the workpiece or of the workpiece from the workpiece batch by the coordinate measuring machine comprises:
a) capturing a first identification feature of the workpiece and a second identification feature of the workpiece batch with a capture device, wherein the second identification feature of the workpiece batch is captured first, and the first identification feature of the workpiece or the workpiece from the workpiece batch is captured subsequent to the second identification feature, wherein the first identification feature is at least one of a first electrically capturable identification feature and a first optically capturable identification feature generated and/or arranged on the workpiece, wherein the second identification feature is at least one of a second electrically capturable identification feature and a second optically capturable identification feature generated and/or arranged on the workpiece batch, and wherein the capture device is at least one of an electrical transceiver configured to communicate with the electrically capturable identification feature and an optical reader configured to capture the optically capturable identification feature, and determining an item of identity information of the workpiece or of the workpiece batch;

b) comparing the item of identity information with items of identity information stored in a database of the plurality of workpieces or the plurality of workpiece batches;

c) identifying a first workpiece or identifying the workpiece batch in the database, and/or characterizing the workpiece or the workpiece batch from the comparison with items of identity information stored in the database in step b), d) determining a measurement procedure stored in the database for the workpiece or for the workpiece from the identified workpiece batch, or suggesting features or steps of the measurement procedure for the workpiece or for the workpiece from the identified workpiece batch; and e) measuring the workpiece or the workpiece from the workpiece batch in accordance with the measurement procedure in the coordinate measuring machine.

11. The method as claimed in claim 10, further comprising at least one of:
generating and mounting a workpiece-specific identification feature on the workpiece from the workpiece batch.

12. A capture device for capturing and writing an identification feature of at least one of a workpiece to be measured by a coordinate measuring machine and an arrangement of a plurality of workpieces, the capture device comprising:
an information capture device configured to capture (i) a first identification feature of the workpiece which is the workpiece of the arrangement of the plurality of workpieces, and (ii) a second identification feature of the arrangement of the plurality of workpieces, wherein the second identification feature of the arrangement of the plurality of workpieces is captured first, and the first identification feature of the workpiece of the arrangement of the plurality of workpieces is captured subsequent to the second identification feature, wherein the first identification feature is at least one of an electrically capturable identification feature and an optically capturable identification feature generated and/or arranged on the workpiece, wherein the second identification is at least one of the electrically capturable identification feature and the optically capturable identification feature generated and/or arranged on the arrangement of the plurality of workpieces, and wherein the capture device is at least one of an electrical transceiver configured to communicate with the electrically capturable identification feature and an optical reader configured to capture the optically capturable identification feature;
a processor configured to:
control the information capture device, and
determine an item of identity information of (iii) the workpiece, and (iv) the arrangement of the plurality of workpieces, wherein the second identification feature of the arrangement of the plurality of workpieces is captured first, and the first identification feature of the workpiece of the arrangement of the plurality of workpieces is determined subsequent to the second identification feature,
a communication interface configured to connect the capture device to the coordinate measuring machine;

the information capture device being an electrical reader configured to communicate with the identification feature, wherein the identification feature is implemented as at least one of a radio chip and a wired chip;
the coordinate measuring machine including a movement device;
a coupling device configured to couple the capture device to the movement device of the coordinate measuring machine, wherein the coupling device is the coupling device which is also present in a measurement system for measurement by the coordinate measuring machine; and
a light projection device configured to project at least one of an image and a pose of the workpiece onto a measurement table of the coordinate measuring machine.

13. The capture device as claimed in claim 12, wherein the measurement by the coordinate measuring machine is a coordinate measurement.

14. A non-transitory computer-readable storage medium encoded with a computer program including a program code that when executed by the coordinate measuring machine, a computer, or the capture device as claimed in claim 12 causes the coordinate measuring machine, the computer, or the capture device to:

a) compare the item of identity information with items of identity information stored in a database of the plurality of workpieces, a plurality of workpiece batches, or a plurality of arrangements of the plurality of workpieces;

b) identify the workpiece from the arrangement of the plurality of workpieces or from a workpiece batch from a comparison with the items of identity information stored in the database in step a) and in interaction with the database, wherein the workpiece from the arrangement or from the workpiece batch is identified subsequent to identifying the arrangement of the plurality of workpieces or the workpiece batch;

c) determine a measurement procedure stored in the database for the workpiece, the arrangement of the plurality of workpieces, or the workpiece batch, or suggest features or steps of the measurement procedure for the workpiece, the arrangement of the plurality of workpieces, or the workpiece batch; and d) transmit the measurement procedure to the coordinate measuring machine for measuring the workpiece from the arrangement of the plurality of workpieces or from the workpiece batch in accordance with the measurement procedure in the coordinate measuring machine.

15. The non-transitory computer-readable storage medium as claimed in claim 14, wherein the program code further causes the coordinate measuring machine, the computer, or the capture device to:
e) measure the at least one workpiece from the arrangement of the plurality of workpieces using the measurement procedure in the coordinate measuring machine.

16. The non-transitory computer-readable storage medium as claimed in claim 14, wherein the program code further causes the coordinate measuring machine, the computer, or the capture device, to at least one of:
compare measurement data from the measurement of the workpiece with target data for the workpiece which are stored in the database; and
forward a result from the comparing of the measurement data to a production machine via a data transmission connection to at least one of control and regulate a production of a further workpiece in the production machine.

17. The non-transitory computer-readable storage medium as claimed in claim 15, wherein the program code further causes the coordinate measuring machine, the computer, or the capture device, to at least one of:

compare measurement data from the measurement of the workpiece with target data for the workpiece which are stored in the database; and forward a result from comparing of the measurement data to a production machine via a data transmission connection to at least one of control and regulate a production of a further workpiece in the production machine.

18. The coordinate measuring machine comprising the capture device as claimed in claim 12.

19. The coordinate measuring machine comprising the non-transitory computer-readable storage medium as claimed in claim 14.

20. A method for measuring a workpiece by a coordinate measuring machine, the method comprising:

a) capturing, by a capturing device, (i) a first identification feature of a workpiece which is the workpiece of an arrangement of a plurality of workpieces, or which is the workpiece of a workpiece batch, and (ii) a second identification feature of the arrangement of the plurality of workpieces or of the workpiece batch, wherein the second identification feature of the arrangement of the plurality of workpieces or of the workpiece batch is captured first, and the first identification feature of the workpiece of the arrangement of the plurality of workpieces or of the workpiece of the workpiece batch is captured subsequent to the second identification feature, wherein at least one of the first identification feature and the second identification feature is an image, a contour, or a shape of the workpiece, of the arrangement of the plurality of workpieces, or of the workpiece batch; and determining an item of identity information of at least one of (iii) the workpiece, (iv) the workpiece batch, and (v) the arrangement of the plurality of workpieces;

b) comparing the item of identity information with items of identity information stored in a database of (vi) a plurality of workpieces, (vii) a plurality of workpiece batches, or (viii) a plurality of arrangements of the plurality of workpieces;

c) at least one of (ix) identifying the workpiece, the workpiece batch, or the arrangement of the plurality of workpieces in the database, and (x) characterizing the workpiece, the workpiece batch, or the arrangement of the plurality of workpieces from the comparison with the items of identity information stored in the database in step b), wherein the workpiece from the arrangement or from the workpiece batch is identified subsequent to identifying the arrangement of the plurality of workpieces or the workpiece batch;

d) determining a measurement procedure stored in the database for the workpiece, the workpiece batch, or the arrangement of the plurality of workpieces, or suggesting features or steps of the measurement procedure for the workpiece, the workpiece batch, or the arrangement of the plurality of workpieces; and e) measuring the workpiece or at least one workpiece from the arrangement of the plurality of workpieces or at least one workpiece from the workpiece batch in accordance with the measurement procedure in the coordinate measuring machine, wherein the at least one workpiece from the arrangement of the plurality of workpieces or the at least one workpiece from the workpiece batch is measured.

* * * * *

UNITED STATES PATENT AND TRADEMARK OFFICE
CERTIFICATE OF CORRECTION

PATENT NO. : 11,493,899 B2  
APPLICATION NO. : 16/207026  
DATED : November 8, 2022  
INVENTOR(S) : Matthias Riek and Thomas Mueller Page 1 of 1

It is certified that error appears in the above-identified patent and that said Letters Patent is hereby corrected as shown below:

On the Title Page

Item (56) FOREIGN PATENT DOCUMENTS change:
"39022549 T2 5/1996" to "69022549 T2 5/1996"

Signed and Sealed this
Second Day of September, 2025

Coke Morgan Stewart
*Acting Director of the United States Patent and Trademark Office*